E. K. PARISH.
Improvement in Three-Horse Equalizers.
No. 129,050. Patented July 16, 1872.
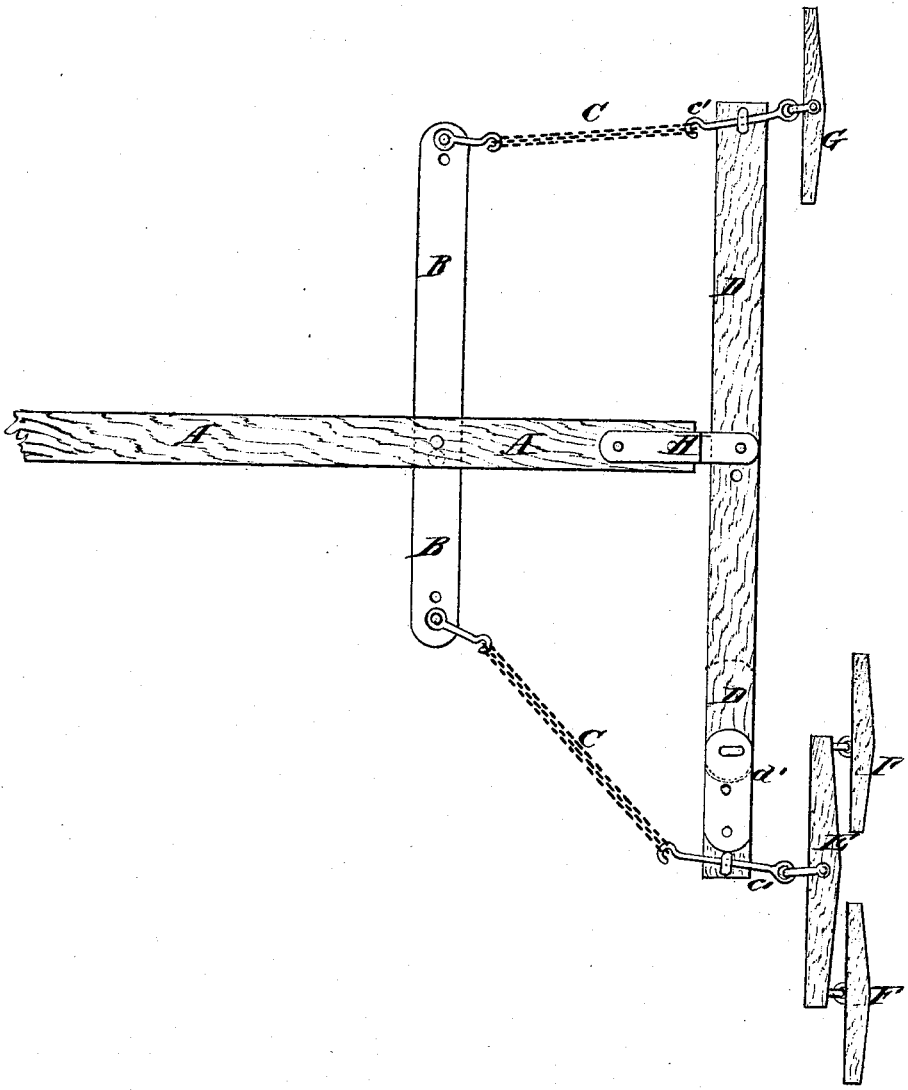

129,050

UNITED STATES PATENT OFFICE.

EDMOND K. PARISH, OF SHELBYVILLE, INDIANA.

IMPROVEMENT IN THREE-HORSE EQUALIZERS.

Specification forming part of Letters Patent No. 129,050, dated July 16, 1872.

Specification describing a new and useful Improvement in Three-Horse Equalizer, invented by EDMOND K. PARISH, of Shelbyville, in the county of Shelby and State of Indiana.

The figure is an under-side view of my improved equalizer, shown as applied to a plow-beam.

My invention has for its object to furnish an improved three-horse equalizer, which shall be so constructed as to enable the draft to be distributed according to the strength of the horses, and which at the same time may be so adjusted that the single horse may walk in the furrow, and the team upon the unplowed land, while each horse draws his proper proportion, and the plow takes the proper amount of land; and it consists in the construction and combination of the various parts, as hereinafter more fully described.

I will describe the equalizer as applied to a plow-beam.

A represents a plow-beam, to which is pivoted at some distance from its forward end a cross-bar or power equalizer, B. The bar B is pivoted eccentrically, and several holes are formed in it to receive the pivoting-pin, so that the leverage may be adjusted as required. To the ends of the cross-bar B are secured the rear ends of the chains C, several holes being formed for the clevis-bolts, so that the point of attachment of said chains may be moved toward or from the pivoting point of said cross-bar as may be required. To the forward parts of the chains C are attached short rods, c, which pass through guide-eyes attached to the end parts of the gauge-bar D. To the forward end of the rod c' of one of the chains C is attached the double-tree E, which is provided with whiffletrees F for the team in the ordinary manner. To the forward end of the rod c of the other chain C is attached the whiffletree G for the third or single horse. The gauge-bar D has a joint d' formed in it near one end to give more freedom of movement to the equalizer. The joint d' is formed by halving the adjacent end of the two parts and attaching metal plates to the opposite sides of the parts of the bar D, so that the said parts of the said bar D may always be held in a horizontal position while allowing the joint to work freely. The gauge-bar D is connected with the forward end of the plow-beam A by the clevis H, which consists of two straps, the rear ends of which are bolted to the upper and lower sides of the forward end of the plow-beam A, and between the forward ends of which is pivoted the gauge-bar D, several holes being formed in the said bar to receive the pivoting-bolt to enable the gauge-bar to be adjusted, as may be desired. The straps H are made with a shoulder or offset, so that the plow may be adjusted to run deeper or shallower in the ground by reversing the said straps H. The bar D is used for regulating or gauging the line of draft, and consequently the width of the furrow. The clevis H holds the bar D always in a horizontal position, and consequently gives steadiness to the running of the plow.

This construction enables the equalizer to be adjusted so that the single horse may walk in the furrow, while each horse draws his proper amount; the plow takes the proper amount of land and runs steady.

Having thus described my invention, I claim as new and desire to secure by Letters Patent—

The adjustable bar B, chains and rods C c', and adjustable gauge-bar D, in combination with each other to adapt them for attachment to a plow-beam or other draft, substantially as herein shown and described, and for the purposes set forth.

EDMOND K. PARISH.

Witnesses:
   THOS. J. CLEURY,
   BRUCE JOHNSON.